3,523,935
DISAZO DYESTUFF CONTAINING m-CRESOL
COUPLING COMPONENTS
William H. Armento, Albany, and Lester N. Stanley, Delmar, N.Y., assignors to GAF Corporation, a corporation of Delaware
No Drawing. Filed Dec. 5, 1966, Ser. No. 598,934
Int. Cl. C09b 31/02; D06p 1/02
U.S. Cl. 260—186                                       1 Claim

ABSTRACT OF THE DISCLOSURE

A dyestuff of the formula

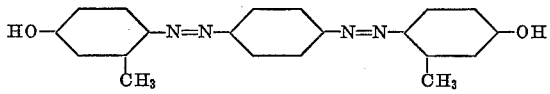

and a method of dyeing polyester fibrous material therewith.

---

The disazo dyestuff of the formula

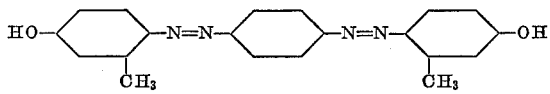

A method of dyeing polyester fibrous material with such dyestuff.

The present invention relates to novel disazo dyes and to a method for dyeing polyester fibers with said dyes.

As is well known, polyester fibers such as those formed of polymeric reaction products of terephthalic acid and polyhydric alcohols have little or no affinity for dyestuffs normally employed for dyeing natural fibers. Furthermore, most dyestuffs proposed for utilization in dyeing such polyesters are not completely suitable in providing dyed articles displaying excellent sublimation and crocking properties, color fastness to light, heat, gases, dry cleaning, alkali, perspiration and similar agents encountered in the normal use, wear, handling and/or washing of the dyed articles.

Thus, it is recognized that a need exists for providing dyestuffs which are characterized by an ability to satisfactorily dye polyester fibers, which are stable, and which broaden the color range of suitable dyes available to the consumer.

Accordingly, it is an object of the present invention to provide a dye for dyeing polyesters which provides colored products having highly improved and/or excellent color stability properties.

It is another object of the present invention to provide a dye effective for dyeing polyester fiber in yellow to orange shades which advantageously display excellent color fastness when subjected to the conditions ordinarily encountered in the dyeing, use, wear, handling, and washing of the fiber.

It is a further object of the present invention to provide a dye for dyeing polyester fiber in yellow to orange shades of excellent sublimation properties, and excellent strength and fastness to light, heat, water, alkali and the like agents ordinarily encountered in the dyeing, use, wear, handling and/or washing of the dyed fibers.

According to the present invention, a water insoluble disazo dye is provided having the structural formula shown above. It will be understood that any of the vacant positions in the middle benzene ring may be substituted by methyl or methoxy without departing from the spirit and scope of this invention.

It has previously been suggested in German Pat. 1,154,433 to employ for dyeing polyester a dye of the formula:

(A)

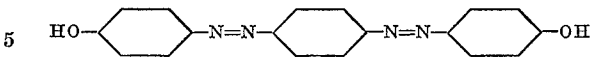

This dye however is lacking in sufficiently high affinity for polyester fiber. We have found that the introduction of methyl groups in the end coupler components in ortho position to the azo linkages has a surprising effect on the properties of the dye. For example, a dyeing is made on polyester fiber of the dye of Example 1 below according to the Thermosol method of dyeing therein described, and a dyeing of the dye of Formula A is also made in the same manner. The dye of Example 1 shows an unexpectedly high affinity for the fiber, the shade being much brighter and pleasing. It is also possible to obtain much heavier shades with the dye of said Example 1 in contrast to that of Formula A.

It is very surprising and unusual that the build-up of the instant dye is so strong in going from weak (1%) dyeings to strong (5%) dyeings in bath dyeing, and that weak to heavy shades are readily obtainable. A stepwise build-up in color intensity is obtainable in proportion to the amount of dye used. This is in contrast to the dye of Formula A which is much weaker in build-up, especially in the heavier shades, i.e. going from 3–5% dyeings.

The dye of the present invention also has a great advantage over other known polyester dyes. Usually those dyes which have excellent to perfect sublimation fastness and thus are useful for application by the Thermosol process are poor in build-up and exhaust when used in batch dyeing. These properties are usually diametrically opposed to each other. Thus it is very unusual and unexpected to find that our dye has both excellent resistance to sublimation, highly desirable for Thermosoling, and also excellent build-up and exhaust properties for use in batch dyeing. This combination of properties makes the dye especially valuable for all round usage since it can be recommended for both uses.

The disazo dyes of the present invention may be produced by diazotizing 4'-aminoacetanilide and coupling with an approximately equimolar amount of m-cresol, deacylating, rediazotizing and coupling the second time with another approximately equimolar amount of m-cresol. Alternatively 4'-nitroaniline may be first diazotized and coupled with an approximately equimolar amount of m-cresol. The nitro group is then reduced, for example with sodium sulfide after which the monoazo compound is then rediazotized and coupled a second time with an approximately equimolar amount of m-cresol. The diazotization, coupling, deacylation and reduction reactions suitably may be carried out according to any of the well known conventional techniques.

In general, polyester articles are dyed with the above described dyestuff by contacting the articles with an aqueous bath containing the dyestuff. Preferably, the contacting is carried out by immersing the article in the dyebath. In the preferred method a carrier or swelling agent and a surface active agent which functions as a dispersing agent are also employed in the dyebath. Specific examples of such carriers include, without limitation, methyl salicylate and o-phenylphenol. The latter may be added to the dyebath in the form of the sodium salt of o-phenylphenol, along with an equivalent amount of diammonium phosphate which converts the sodium salt into the phenylphenol in situ. The dyeing may be completed at temperatures of about 80° C. up to the boil, followed by washing and rinsing the dyed product.

A second method of dyeing the fiber with the dyestuff is by contacting the polyester fiber with the same dyebath at super atmospheric pressures and temperatures from about 90° to 125° C. or more.

A preferred method of dyeing the fiber with the dyestuff is by means of the Thermosol process wherein the fiber is padded with a dispersion of the dyestuff, dried, and subjected to a temperature of about 190° to 230° C. for about ½ to 2 minutes. It is in the exercise of this method of dyeing that sublimation fastness is very important, and the fact that the instant dyes have excellent sublimation fastness accounts for their value.

The dyeing may be carried out in the presence of any surface active agent conventionally employed for providing dyestuff and/or carrier dispersions, such as sodium lignosulfonate, alkylnaphthalenesulfonates, alkali metal sulfates, ethylene oxide condensation products of alkylphenols, fatty alcohols, fatty acids and fatty amides and the like.

The amount of dyestuff employed in the dyebath may vary widely. The amount usually employed in the embodiments of the invention wherein the dyeing is effected by immersing the fabric into the hot dyebath is in the range of about 0.01 to 15 parts by weight, preferably 0.1 to 10 parts by weight, per 100 parts of water in the dyebath. In embodiments of the invention wherein the Thermosol dyeing technique is employed, greater proportions of dyestuff to water may be employed, the dyebath utilized being in the form of a dispersion of the dyestuff. Proportions of carrier and dispersing agent employed in the dyebath are those usual in the trade and readily and routinely determinable in any particular instance.

The dyeing is carried out over a period of time requisite to provide the desired build-up of dyestuff, as evidenced by the color depth of the dyed article to be obtained. At the above indicated preferred temperatures and dye concentrations, the time normally required is in the range of a few minutes to about 3 hours.

It is understood that the actual temperature and time period employed in a given embodiment of the invention will vary depending upon, inter alia, the dyeing technique employed, the particular nature and amounts of polyester and dyestuff employed, and the desired color depth of the final dyed product as well as the particular carrier and surface active agent, if any, utilized.

Following the dyeing step, the dyed article may be rinsed and dried in any conventional manner.

The present method contemplates dyeing polyesters broadly. The particular polyesters most commonly utilized are the polyesters of terephthalic acid and aliphatic and aromatic polyhydric alcohols, e.g. ethylene glycol, propylene glycol, glycerine, p-xylene glycol and the like, particularly polyethylene terephthalate (e.g. Dacron).

The following examples are given for illustration purposes and not by way of limitation. All parts and proportions referred to herein and in the appended claims are by weight unless otherwise indicated.

EXAMPLE 1

38 g. of 4'-aminoacetanilide, 67 cc. of concentrated hydrochloric acid and 250 cc. of water are stirred to a smooth slurry and diazotized at below 5° C. with 90 cc. of 38.5% by volume sodium nitrite. The diazo is clarified by treating with Nuchar (activated carbon) and filtering. The diazo is then run gradually below 15° C. into a solution of 27 g. of m-cresol dissolved in 750 cc. of water, 25 cc. of 40% sodium hydroxide and 10 g. of soda ash while maintaining a pH of 8.5 by addition of sodium hydroxide as required. 190 cc. of 40% sodium hydroxide is added, or enough to attain a concentration of 4.2% by volume. This slurry is then boiled for about 3 hours. It is then cooled, neutralized with hydrochloric acid, filtered and washed. The yield is approximately 60 g.

15 g. of this product is slurried with 60 cc. concentrated hydrochloric acid and diazotized at 25–30° C. with 8 cc. of sodium nitrite (38.5% by volume). After diazotization 400 cc. of water is added. This is then run into a solution of 4.3 g. of m-cresol dissolved in 300 cc. of water, 4 cc. of 40% sodium hydroxide and 25 g. of soda ash while maintaining the temperature below 25° C. and the pH at about 8.5 by addition of sodium hydroxide as needed. The dye is filtered, washed and dried. 12 g. of dyestuff is obtained having the structural formula first shown above. The dye is then dispersed for use to a 40% concentration as a powder with Marasperse B (lignosulfonate dispersing agent) at a pH of 8.5.

EXAMPLE 2

2 oz. of the above dyestuff powder is dispersed in 83 cc. of warm water and poured into an aqueous solution containing 0.2 g. of sodium alginate and 1 cc. of sodium isopropylnaphthalenesulfonate. The resultant solution is diluted up to a gallon with water. Dacron fabric is padded with this paste at about 70° C., dried, and cured at about 220° C. for 90 seconds. The dyed material is then soaped at the boiling point for 5 minutes, washed and dried. A bright strong orange dyeing is obtained which has excellent sublimation, wash and crock fastness properties and good fastness to light.

EXAMPLE 3

A dyebath is prepared by initially mixing about 1 cc. of a 10% solution of Avitone T (sodium hydrocarbonsulfonate) with stirring into 100 cc. of water at 54° C. About 20 cc. of each of a 10% solution of diammonium phosphate and a 10% solution of sodium phenylphenolate are then introduced with stirring into the resulting mixture. A dispersion of about 1 g. of the dyestuff of Example 1 pasted in 10 cc. of a 10% solution of Avitone T is then mixed with the phosphate-containing mixture and the resultant mixture is then diluted with water to 300 cc.

A sample of Dacron fabric is immersed in the dyebath and the dyebath is heated to boiling. The fabric is maintained in the dyebath for about 1 hour, removed, soaped in a boiling 0.1% soap solution for about 5 minutes, thereafter rinsed with water and dried. The dyeing has a bright, strong orange color and the dyed fabric displays excellent sublimation properties, and excellent fastness to heat, light, washing and crocking.

EXAMPLE 4

Example 3 is repeated with the exception that a dispersion of 3 g. of the dyestuff of Example 1 is used in place of 1 g. The dyeing has a bright, strong orange color, considerably deeper than that which is obtained in Example 3. The dyeing also displays excellent sublimation properties, and excellent fastness to heat, light, washing and crocking.

We claim:
1. A dyestuff of the formula

References Cited

UNITED STATES PATENTS 2,782,185   2/1957   Merian _____ 260—186
3,045,004   7/1962   Gaetani _____ 260—186
3,186,787   6/1965   Gies et al. _____ 260—186 X

FOREIGN PATENTS 1,016,246   1/1966   Great Britain.

OTHER REFERENCES

Derwent: Japanese Patents Report, 5, No. 26, p. 9 (August 1966).

CHARLES B. PARKER, Primary Examiner

D. M. PAPUGA, Assistant Examiner

U.S. Cl. X.R.

8—41, 55

UNITED STATES PATENT OFFICE
CERTIFICATE OF CORRECTION

Patent No. 3,523,935              Dated  August 11, 1970

Inventor(s) WILLIAM H. ARMENTO ET AL

It is certified that error appears in the above-identified patent and that said Letters Patent are hereby corrected as shown below:

Column 4, Claim 1, the structural formula should read

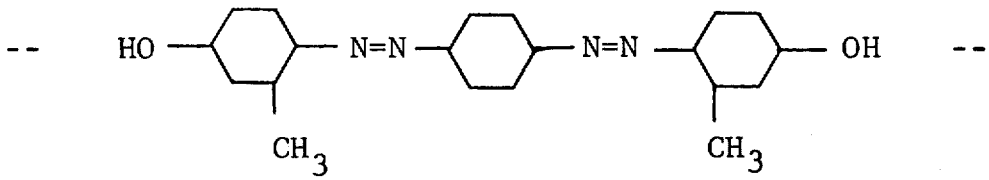

Signed and Sealed
JAN 5 1971

(SEAL)
Attest:

Edward M. Fletcher, Jr.
Attesting Officer

WILLIAM E. SCHUYLER, JR.
Commissioner of Patents